United States Patent
Kobayashi

(10) Patent No.: US 8,337,756 B2
(45) Date of Patent: Dec. 25, 2012

(54) SOLIDIFICATION PROCESSING METHOD AND SOLIDIFICATION PROCESSING APPARATUS

(75) Inventor: Yoshikazu Kobayashi, Fukuyama (JP)

(73) Assignee: Miike Tekkou Kabushikigaisha, Fukuyama-Shi, Hiroshima (JP)

(*) Notice: Subject to any disclaimer, the term of this patent is extended or adjusted under 35 U.S.C. 154(b) by 626 days.

(21) Appl. No.: 12/374,940

(22) PCT Filed: Jul. 26, 2007

(86) PCT No.: PCT/JP2007/000800
§ 371 (c)(1),
(2), (4) Date: Apr. 8, 2009

(87) PCT Pub. No.: WO2008/012951
PCT Pub. Date: Jan. 31, 2008

(65) Prior Publication Data
US 2009/0320358 A1 Dec. 31, 2009

(30) Foreign Application Priority Data

Jul. 26, 2006 (JP) ................. 2006-203300
Jul. 26, 2006 (JP) ................. 2006-203301
Jul. 26, 2006 (JP) ................. 2006-203302

(51) Int. Cl.
*B30B 11/24* (2006.01)
*C10L 5/44* (2006.01)
*C10L 5/46* (2006.01)
*B01J 8/10* (2006.01)

(52) U.S. Cl. ........ 422/108; 422/198; 422/225; 422/233; 100/145; 100/904; 44/593; 44/629; 425/200

(58) Field of Classification Search .............. 422/108, 422/198, 225, 233; 100/145, 904; 44/593, 44/629; 425/200
See application file for complete search history.

(56) References Cited

U.S. PATENT DOCUMENTS
4,357,291 A * 11/1982 Miller et al. ............. 264/211.23
(Continued)

FOREIGN PATENT DOCUMENTS
EP 1 083 212 A1 3/2001
(Continued)

OTHER PUBLICATIONS
English Abstract for JP 03-000180 A (Jan. 1991).*
English Abstract and machine translation for JP 08-300348 A (Nov. 1996).*
(Continued)

*Primary Examiner* — Jennifer A Leung
(74) *Attorney, Agent, or Firm* — Birch, Stewart, Kolasch & Birch, LLP

(57) ABSTRACT

For manufacture of solid fuels by solidifying processing-object materials containing plastics, waste paper and waste wood, the processing-object materials inputted through an input port 12 are subjected to water injection so that their water content becomes 15 wt % or more, preferably 20 wt % or more, and then kneaded, compacted and extruded in three turns or less, being extruded from molding nozzles 53 of an end face plate 5. The water injection is performed by a water injection nozzle 31 from the input port 12 into a casing 11. Opening and closing of a solenoid valve 33 interposed on a water injection pipe 32 adjoining the water injection nozzle 31 is controlled based on a signal S1 derived from a temperature sensor 55 provided at a molding nozzle 53 of the end face plate. Such disadvantages as inflammation due to excessively high temperatures of the processing-object materials or worsened shape retention of solidified materials due to excessively low temperatures of the processing-object materials can be prevented.

12 Claims, 9 Drawing Sheets

U.S. PATENT DOCUMENTS 4,648,827 A * 3/1987 Laimer et al. ................. 425/208

FOREIGN PATENT DOCUMENTS

| | | | |
|---|---|---|---|
| JP | 59-140297 A | | 8/1984 |
| JP | 1085701 A | | 3/1989 |
| JP | 03000180 A | * | 1/1991 |
| JP | 07256644 A | * | 10/1995 |
| JP | 08300348 A | * | 11/1996 |
| JP | 11-189779 A | | 7/1999 |
| JP | 2000288504 A | | 10/2000 |
| JP | 2002361492 A | | 12/2002 |
| JP | 2005111847 A | | 4/2005 |

OTHER PUBLICATIONS

Machine translation for JP 07-256644 A (Oct. 1995).*

Katsushiro Seki, "RPF no Genjo to Kongo no Mitohshi (The present condition of RPF and a future prospect)," Japan TAPPI Journal, 2002, vol. 56, No. 10, pp. 1434-1438 and its English translation.

Written Opinion of the International Searching Authority, International Application No. PCT/JP2007/000800.

Written Opinion of the International Searching Authority, International Application No. PCT/JP2007/000800, (mailed on Oct. 2, 2007).

* cited by examiner

PRIOR ART

SOLIDIFICATION PROCESSING METHOD
AND SOLIDIFICATION PROCESSING
APPARATUS

BACKGROUND OF THE INVENTION

The present invention relates to a solidification processing method, as well as a solidification processing apparatus, suitable for, with thermoplastics as a binder, manufacturing solid fuels usable as an alternative to fossil fuels such as coal and coke from waste plastics, waste paper, waste wood and the like that are hard to treat for material recycle in the industrial waste treatment.

Recycling process of wastes is important as a countermeasure against environmental problems. An example of practicalized recycling process of wastes is that flammable wastes including paper materials, plastic materials and cloth materials, such as shredder dust, food packaging containers or used clothes are utilized as raw materials of regenerated fuels.

As an apparatus for manufacturing solid regenerated fuels by using those kinds of wastes, a twin-screw extrusion molding machine as shown in FIG. 8 is conventionally known (see, e.g., JP H10-85701 A). This extrusion molding machine has, within a casing 101, a cylindrical-shaped hollow portion having a calabash-shaped cross section. Two screw shafts 103, 103 with their center axes directed parallel to each other are inserted in the hollow portion of the casing 101. Each of the screw shafts 103 has screw blades while a wingless increased-diameter portion 120 having no screw blades is formed so as to be shifted toward the forward end from a longitudinal center of the screw shaft 103. The screw shaft 103 has first screw blades 121 on one side closer to its base end than the wingless increased-diameter portion 120, and second screw blades 122 on one side closer its forward end than the wingless increased-diameter portion 120. An inner wall of the casing 101 that defines the hollow portion is proximate to outer edges of the first and second screw blades 121, 122 as well as proximate to a circumferential surface of the wingless increased-diameter portion 120 to form a restricting portion. The screw shafts 103 are driven by an unshown motor so as to be rotated in mutually opposite directions via mutually meshed gear wheels 111, 111. Thus, the first and second screw blades 121, 122 are driven into rotation so as to mesh with each other from up to down.

This twin-screw extrusion molding machine operates in the following manner. Wastes including waste plastic materials are preliminarily course crushed, selected, and inputted into the hollow portion through an input port 102 of the casing. The inputted wastes are, while crushed and kneaded, transferred to the wingless increased-diameter portion 120 side by the first screw blades 121 of the screw shafts. Heaters are provided on a side face of the casing 101 so that plastics in the wastes are softened or melted by heat of the heaters. Wastes containing the softened or molten plastics are compacted during a process of being extruded through between the restricting portion of the inner wall of the casing 101 and the wingless increased-diameter portion 120, thus being put into a fluidized state. The fluidized wastes are extruded in a bar-like form through nozzle holes 116 of an end face plate 115 by the second screw blades 122. The wastes extruded in the bar-like form are solidified as their temperature falls, thus solid regenerated fuels being obtained.

However, in this twin-screw extrusion molding machine, waste passages formed between the inner wall of the casing 101 and surfaces of the screw shafts 103 have cross sections decreasing from the first screw blades 121 toward the wingless increased-diameter portion 120 and increasing from the wingless increased-diameter portion 120 toward the second screw blades 122. Therefore, the wastes extruded through between the restricting portion of the inner wall of the casing 101 and the wingless increased-diameter portion 120 tend to be diffused between the inner wall of the casing 101 and the second screw blades 122. As a result, the wastes extruded through the nozzle holes 116 are relatively lower in density, posing an issue that the wastes tend to be insufficient in shape retention after the solidification.

Also, heating is applied over wide ranges within the casing 101 by the heaters provided on the side face of the casing 101, incurring problems of lower heating efficiency and lower precision of temperature control over the wastes. Lower precision of temperature control over the wastes may lead to high temperatures of the wastes, causing occurrence of inflammation or toxic gas, or otherwise lead to low temperatures of the wastes and to insufficient melting of the melting materials, incurring such disadvantages as insufficient shape retention of the solidified materials. These and other issues relating to the temperature control on the wastes are not taken into consideration in JP H10-85701 A.

Thus, in view of the issues of the above-described apparatus, there has been proposed an extrusion apparatus which is simple in structure and miniaturizable in size and yet generally equivalent or higher to conventional counterparts in terms of the power of breakage, kneading, melting and compaction, thus being suitable for manufacture of solid fuels from wastes (see, e.g., JP 2002-361492 A). However, in this apparatus, since the breakage, kneading, melting and compaction processes are rapidly performed due to its smaller size, there may result insufficient kneading of processed materials, or occurrence of inflammation due to abrupt temperature elevations of the processed materials.

SUMMARY OF THE INVENTION

Accordingly, an object of the present invention is to provide a solidification processing method and a solidification processing apparatus both of which are suitable for rapidly performing breakage, kneading, melting and compaction of processing-object materials with a small-size structure. A further object of the invention is to provide solidification processing method and apparatus capable of obtaining solid fuels of high quality by effectively fulfilling temperature control.

In order to solve the above-described issues, the present inventor has found through keen researches that for the manufacture of solid fuels from waste plastics, waste paper, waste wood and the like with thermoplastics used as a binder, it is advantageous to set a water content of waste paper and waste wood to 15 wt % or more, preferably 20 wt % or more, for kneading with plastic materials. That is, it has been found that with water injection effected to the above water content level, processing-object materials become easier to meet together and easier to knead together, and yet the water contents become heated steam and move among the processing-object materials so that the heating efficiency for the processing-object materials becomes better while the above water content level is preferable also for temperature control to prevent the inflammation of solidified materials. It has been verified that solidified fuels obtained by performing such water injection and temperature control have enough product quality and heat quantity for use as an alternative to fossil fuels such as coal and coke. Thus, the present invention has been completed.

Accordingly, the present invention provides a solidification processing method for kneading and compacting processing-object materials containing at least thermoplastics and paper refuse or wood refuse to manufacture solid fuels, the method comprising:

first performing water injection to processing-object materials to impregnate paper refuse or wood refuse with water; subjecting the processing-object materials to a first turn step of starting and kneading by screw shafts; then subjecting the processing-object materials to a second turn step of compacting by the screw shafts while preventing backflow; and performing a third turn step of further compacting the processing-object materials by the screw shafts, whereby thermoplastics contained in the processing-object materials are melted by both heat generation caused by the compaction in the second and third turn steps and heating with heaters provided on an end face plate and the processing-object materials are extruded through discharge holes of the end face plate so as to be solidified and, in parallel with this, while water content injected into the processing-object materials are sucked up as heated steam in a direction opposite to a feed direction of the processing-object materials, temperature of the processing-object materials is detected and, based on a signal showing the detected temperature, quantity of water injection to the processing-object materials is controlled.

According to this method, by the water injection, paper refuse originating from waste paper as an example or wood refuse originating from waste wood as an example is impregnated with water so as to be improved in fluidity. Therefore, paper refuse or wood refuse and plastic debris are easy to knead and yet fluidize as they are formed into heated steam by compacting heat or the like, thus heat conduction in the processing-object materials is enhanced. Further, by the water injection, temperature control can be fulfilled so as to prevent inflammation of the solidified fuels extruded through the discharge holes of the end face plate. As a result of these, even if kneading and compaction is performed rapidly in two to three turns with the small-size structure, there is no fear for abnormal increases in torque load of the screw shafts or inflammation of the processing-object materials. Also, the water content injected into the processing-object materials is heated and finally discharged as steam, thus not being a cause of worsening the flammability of the solid fuels. Furthermore, the heated steam is sucked up, for example, through the input port for processing-object materials and so sucked up in a direction opposite to the feed direction of the processing-object materials, the possibility that a large amount of heated steam is mixed into the processing-object materials that are kneaded and compacted toward the end face plate is prevented, so that solid fuels of high density and high heating value can be manufactured. In this connection, in comparison between cases where water injection is effected on the processing-object materials and where not, the torque load of the screw shafts that perform kneading and compacting of the processing-object materials can be reduced by 10% to 15%. Also, in a case where the screw shafts are driven with equal driving force, the production yield of solidified materials can be increased by 15% to 20%. Moreover, the water content of solidified materials after cooling and drying can be reduced to 10 wt % (weight percentage) or less.

In one embodiment of the solidification processing method, in the processing-object materials, the thermoplastics occupy 40 to 60 wt % (weight percentage) while the paper refuse or wood refuse occupies 30 to 40 wt %.

According to this embodiment, solidified materials having a heating value of 5000-6000 cal/g and usable as an alternative to fossil fuels can be obtained.

In one embodiment of the solidification processing method, when the water content of the processing-object materials is about 15 wt %, the temperature of the processing-object materials is controlled to within a temperature range of 100° C. to 140° C.

According to this embodiments in the process of kneading and compacting the processing-object materials, the disadvantage that inflammation occurs due to heat generation caused by compaction or to heating by the heaters can be prevented. Further, in the process of kneading and compacting the processing-object materials, water content can properly be removed in the form of heated steam, so that deterioration of flammability with the solidified materials used as a fuel can be prevented.

In one embodiment of the solidification processing method, when the water content of the processing-object materials is 20 wt % or more, the temperature of the processing-object materials is controlled to within a temperature range of 120° C. to 180° C.

According to this embodiment, fluidity of the processing-object materials is enhanced to facilitate the kneading and compaction, inflammation of the processing-object materials can be prevented, and moreover deterioration of flammability of the solidified materials can be prevented.

In another aspect of the present invention, there is provided a solidification processing apparatus for kneading and compacting processing-object materials containing at least thermoplastics and paper refuse or wood refuse to manufacture solid fuels, the apparatus comprising:

a casing having an input port through which processing-object materials are to be inputted;

a pair of rotation driving shafts which are placed in the casing and which are rotationally driven in mutually opposite directions;

screw shafts which are removably fitted to the pair of rotation driving shafts, respectively, and each of which has a first screw member for sandwiching processing-object materials inputted through the input port and feeding the processing-object materials toward an end face side of the casing, a second screw member for, while preventing backflow, compacting the processing-object materials, and a third screw member for further compacting the processing-object materials and extruding the processing-object materials out of the casing;

an end face plate which is removably fitted to an end face of the casing and which has discharge holes for discharging the processing-object materials extruded by the third screw member;

heaters provided on the end face plate;

a water injection section for performing water injection into the casing;

an exhaust port formed in the casing;

a blower which is connected to the exhaust port to exhaust inside of the casing;

a temperature sensor for detecting a temperature of the processing-object materials processed by the screw shafts; and a control section for, based on a signal derived from the temperature sensor, controlling quantity of water injected by the water injection section.

With this constitution, by the pair of rotation driving shafts being rotationally driven, the screw shafts fitted to the rotation driving shafts, respectively, are rotationally driven in mutually opposite directions. The screw shafts each having first to third screw members, the first screw members sandwich processing-object materials inputted through the input port and feed the processing-object materials toward the end face side of the casing. The second screw members, while preventing backflow, compact the processing-object materials fed from the first screw members. Subsequently, the third screw members further compact the processing-object materials and extrude the processing-object materials through the discharge holes of the end face plate. In this way, since progressively higher compacting forces can be given to the processing-object materials that are being kneaded, the processing-object materials extruded from the discharge holes of the end face plate can be made enough high in density. As a result, solidified materials resulting from cooling of the extruded processing-object materials have enough shape retention.

Further, by operations of the second and third screw members, enough quantities of compacting heat and frictional heat can be generated in the processing-object materials. As a result, without providing the heaters on the side face of the casing as would conventionally be involved, melting materials contained in the processing-object materials can be melted enough only by the heaters of the end face plate.

Furthermore, the control section controls the water injection quantity into the casing by the water injection section based on a temperature of the processing-object materials processed by the screw shafts. Thus, the temperature of the processing-object materials is kept stably at proper temperatures, so that solidified materials of stable quality can be obtained.

In this case, steam is generated in the casing along with the water injection into the casing. The resulting steam is discharged by the blower through the exhaust ports, by which such disadvantages as abnormal pressure increases in the casing and leakage of steam from the input port can be prevented. Also, the disadvantage that oil seals provided on the rotation driving shafts may be damaged due to increases in the air pressure within the casing or other like disadvantages can be prevented.

Preferably, the blower discharges exhaust objects containing the steam out of the building in which the solidification processing apparatus is set up. This allows the operator of the solidification processing apparatus to work under a better environment.

It is noted here that the exhaust objects refer to objects that can be discharged from within the casing by the blower, including not only steam but also other gases, liquid fine particles or power dust.

Further, the temperature sensor is not limited in its placement position and may be placed at any position such as inside the casing or on the end face plate. In short, the temperature sensor may be placed at any position as far as the temperature of the processing-object materials processed by the screw shafts can be detected.

In one embodiment of the solidification processing apparatus, the exhaust port is placed on widthwise both sides of the input port.

According to this embodiment, the processing-object materials are inputted through the input port while the interior of the casing is exhausted through the exhaust ports on widthwise both sides of the input port. As a result of this, exhaust flows can efficiently be generated in the casing. Also, since exhaust flows can be formed in the casing in a direction opposite to the transfer direction of the processing-object materials, steam or the like can be prevented from mixing into the processing-object materials extruded from the discharge holes of the end face plate. Accordingly, solidified materials resulting from cooling of the extruded processing-object materials can be prevented from deteriorating in quality. In addition, the widthwise direction of the input port refers to a direction generally perpendicular to the direction in which the processing-object materials inputted through the input port are transferred, the widthwise direction being generally perpendicular to the direction in which the rotation driving shafts and the screw shafts extend.

In one embodiment of the solidification processing apparatus, the control section starts water injection by the water injection section when the temperature of the processing-object materials comes to a specified temperature or higher, and the control section stops the water injection by the water injection section when the temperature of the processing-object materials becomes lower than the specified temperature.

According to this embodiment, by the control of the water injection into the casing by the control section, the temperature of the processing-object materials can be controlled so as to fall within a specified temperature range. As a result of this, the disadvantage that the processing-object materials go high temperatures to fire, or that the processing-object materials go low temperatures to result in deteriorated shape retention after the solidification, or other disadvantages can be prevented. As a result, the solidification processing apparatus is enabled to ensure the safety of operation and yield solidified materials of stable quality.

In one embodiment of the solidification processing apparatus, the solidification processing apparatus further comprises an input section to which an operation stop command is to be inputted, wherein upon input of a stop command to the input section, the control section performs water injection by the water injection section for a specified time duration.

According to this embodiment, when the operation is stopped upon input of an operation stop command, water injection into the casing is performed for a specified time duration. After completion of this water injection for the specified time duration, the operation of the screw shafts is stopped, by which the operation is stopped. Thus, the operation can be stopped in a state that the processing-object materials within the casing have been softened.

Accordingly, start-up failures due to the processing-object materials solidified in the casing, or increases in the load on the power source, can be prevented at a next-time operation start.

In addition, whereas steam is generated along with the water injection into the casing, it is preferable to exhaust the steam-containing exhaust object from within the casing. As a result of this, such disadvantages as abnormal pressure increases in the casing and leakage of steam through the input port can be prevented. The exhaust from the inside of the casing is preferably effected in a direction opposite to the transfer direction of the processing-object materials. As a result, the disadvantage that steam or the like is mixed into the processing-object materials discharged from the discharge holes can be prevented.

In one embodiment of the solidification processing apparatus, the control section includes control means for exerting such control as to start water injection when the temperature of the processing-object materials comes to a specified temperature or higher and to stop the water injection when the temperature of the processing-object materials becomes lower than the specified temperature.

According to this embodiment, the temperature of the processing-object materials can be controlled so as to fall within a specified temperature range. As a result of this, the disadvantage that the processing-object materials go high temperatures to fire, or that the processing-object materials go low temperatures to result in deteriorated shape retention after the solidification, or other disadvantages can be prevented effectively. As a result, the solidification processing apparatus can be operated safely and solidified materials obtained by the apparatus can be made stable in quality.

In one embodiment of the solidification processing apparatus, the control section performs water injection into the casing before stopping the operation.

According to this embodiment, after completion of the water injection for a specified time duration, the operation of the screw shafts is stopped, by which the operation is stopped. Thus, the operation can be stopped in a state that the processing-object materials within the casing have been softened by increased water contents. Accordingly, start-up failures due to the processing-object materials solidified in the casing, or increases in the load on the power source, can be prevented at a next-time operation start.

ADVANTAGEOUS EFFECT OF THE INVENTION

As will be appreciated from the foregoing, according to the present invention of a solidification processing apparatus, processing-object materials inputted through an input port are impregnated with water, thus the processing-object materials are sufficiently kneaded in a first turn step by screw shafts. Continuingly, the processing-object materials are subjected to a second turn step and a third turn step of compacting and are heated, whereby the processing-object materials are heated by steam and temperature of the processing-object materials can be controlled, therefore, inflammation of solidified materials extruded through discharge holes of an end face plate are prevented and the solidified materials have enough shape retention. Further, based on a temperature of the processing-object materials processed by the screw shafts, quantity of water injected into an casing by a water injection section are controlled, thus, the temperature of the processing-object materials is kept stably at proper temperatures, therefore solidified materials of stable quality can be obtained. Further, inside of the casing is exhausted by a blower which is connected to the exhaust port, thus the resulting steam generated along with the water injection is rapidly discharged, therefore breakdowns caused by abnormal pressure increases in the casing can be prevented and solidified materials of stable quality can be obtained.

Furthermore, according to one embodiment of the solidification processing apparatus, the exhaust port is placed on widthwise both sides of the input port, thus exhaust flows can be efficiently be generated in the casing. Also, since exhaust flows can be formed in the casing in a direction opposite to the transfer direction of the processing-object materials, steam or the like can be prevented from mixing into the processing-object materials extruded from the discharge holes of the end face plate.

Furthermore, according to one embodiment of the solidification processing apparatus, the control section starts water injection by the water injection section when the temperature of the processing-object materials comes to a specified temperature or higher, and the control section stops the water injection by the water injection section when the temperature of the processing-object materials becomes lower than the specified temperature, thus the temperature of the processing-object materials can be controlled so as to fall within a specified temperature range, therefore the solidification processing apparatus is enabled to ensure the safety of operation and yield solidified materials of stable quality.

Furthermore, according to one embodiment of the solidification processing apparatus, the solidification processing apparatus further comprises an input section to which an operation stop command is to be inputted, wherein upon input of a stop command to the input section, the control section performs water injection by the water injection section for a specified time duration. Thus, the operation can be stopped in a state that the processing-object materials within the casing have been softened. Accordingly, start-up failures due to the processing-object materials solidified in the casing, or increases in the load on the power source, can be prevented at a next-time operation start.

Besides, according to the present invention of a solidification processing method, subjecting processing-object materials to a first turn step of starting and kneading, a second turn step of compacting and a third turn step of further compacting by screw shafts, by which heat generation are caused by the friction and compaction of the processing-object materials. Meanwhile temperature of the processing-object materials is detected and, based on a signal showing the detected temperature, quantity of water injection into the processing-object materials is controlled, therefore the temperature of the processing-object materials is kept stably at proper temperatures, so that solidified materials of stable quality can be obtained.

Furthermore, according to one embodiment of the solidification processing method, water injection into the processing-object materials is started when the temperature of the processing-object materials comes to a specified temperature or higher, and the water injection is stopped when the temperature of the processing-object materials becomes lower than the specified temperature. As a result of this, the disadvantage that the processing-object materials go high temperatures to fire, or that the processing-object materials go low temperatures to result in deteriorated shape retention after the solidification, or other disadvantages can be prevented.

Furthermore, according to one embodiment of the solidification processing method, when the operation of the solidification processing is stopped, water injection into the processing-object materials is performed for a specified time duration. As a result of this, the operation can be stopped in a state that the processing-object materials have been softened. Accordingly, start-up failures due to the processing-object materials solidified in the casing, or increases in the load on the power source, can be prevented at a next-time operation start.

Figure 1:
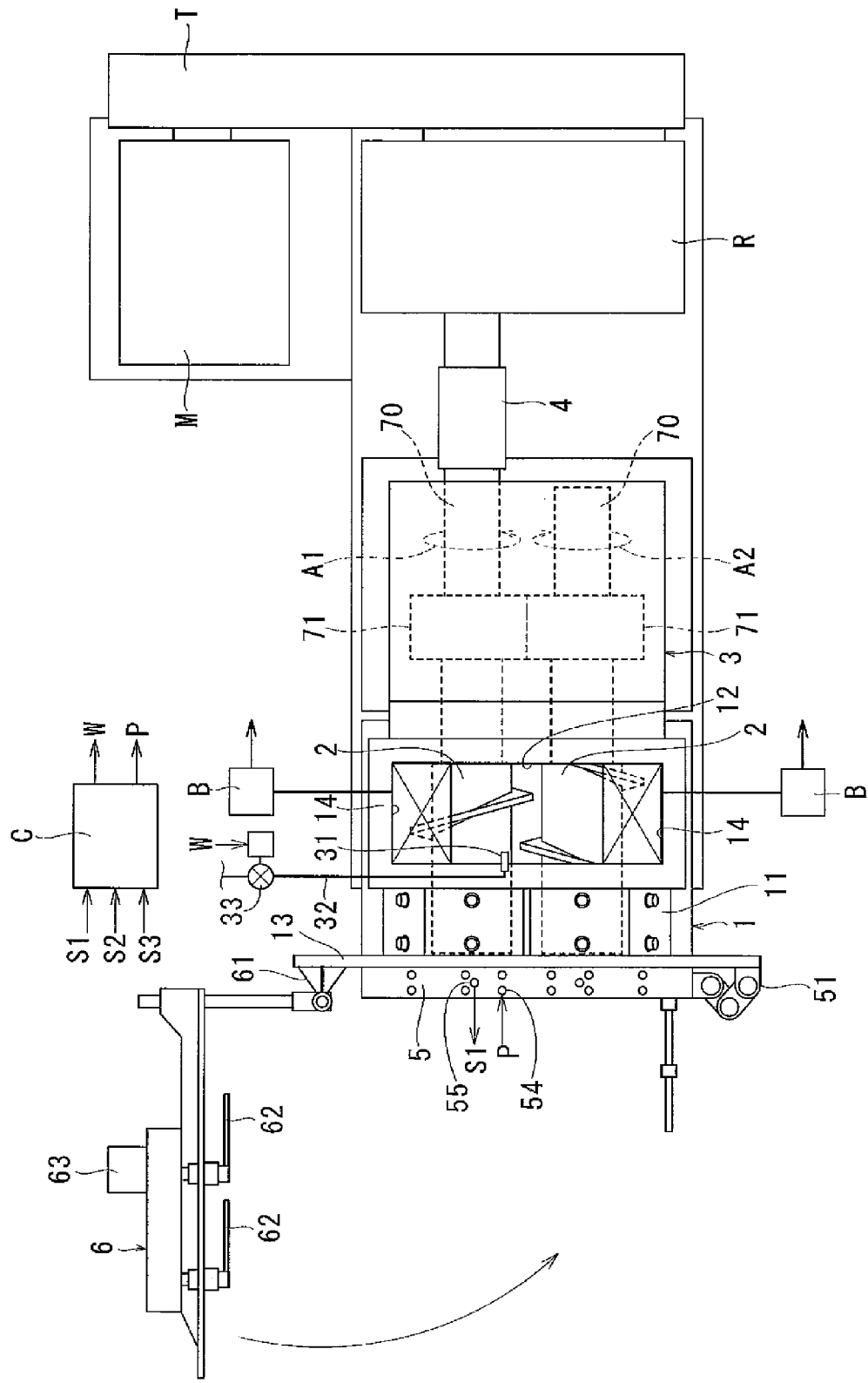
FIG. 1 is a plan view showing a solidification processing apparatus according to an embodiment of the present invention.

REFERENCE NUMERALS 1 main body
2 screw shaft 5 end face plate
11 casing
12 input port
14 exhaust port
21 first screw member
22 second screw member
23 third screw member
31 water injection nozzle
32 water injection pipe
33 solenoid valve
52 discharge hole
53 molding nozzle
54 heater
55 temperature sensor
72 drive shaft
B blower
C control section

DETAILED DESCRIPTION OF THE PREFERRED EMBODIMENTS

Hereinbelow, the solidification processing apparatus of the present invention will be described in detail by way of embodiments thereof illustrated in the accompanying drawings.

Figure 2:
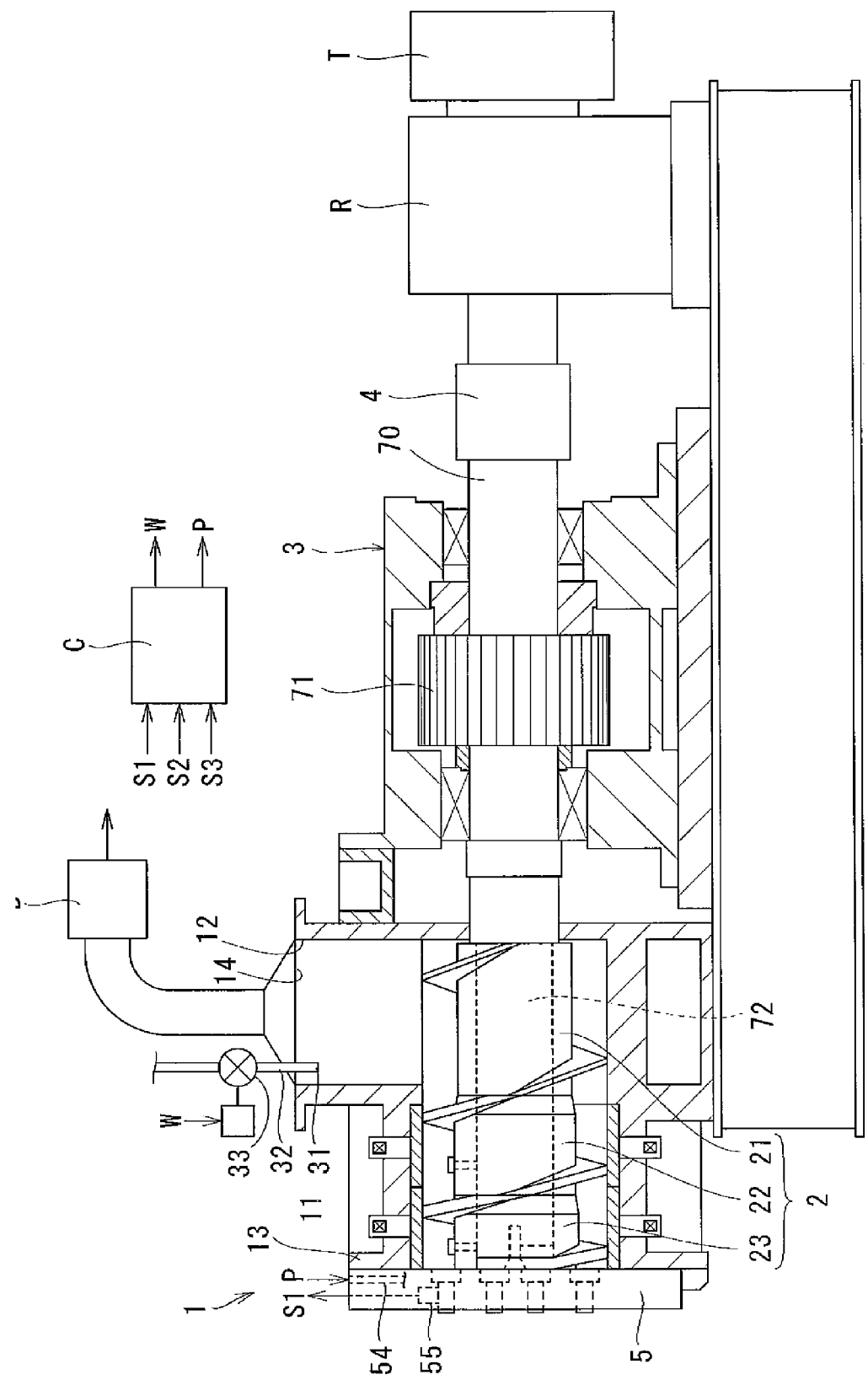
FIG. 2 is a side view showing the solidification processing apparatus.

FIG. 1 is a plan view showing a solidification processing apparatus according to an embodiment of the invention, and FIG. 2 is a side view showing the solidification processing apparatus.

This solidification processing apparatus is an apparatus for processing wastes containing plastics, which are melting materials, and paper refuse or wood refuse, which is non-melting materials, as an example of processing-object materials that are materials to be processed, the apparatus being a solid fuel manufacturing apparatus which compacts and solidifies those wastes to manufacture solid regenerated fuels. The paper refuse originates from waste paper, and the wood refuse originates from waste wood. Whereas plastics, waste paper and waste wood are all relatively difficult to treat for material recycle, the solidification processing apparatus of this embodiment makes it possible to recycle the above-mentioned materials into solidified fuels of high quality and high heating value.

This solid fuel manufacturing apparatus is composed roughly of a main body 1 for performing process of processing-object materials, a gearbox 3 for driving the main body 1, a speed reducer R, a transmission gear T and a motor M.

In the main body 1, a pair of screw shafts 2, 2 for kneading and compacting the processing-object materials are housed in a casing 11 in which an input port 12 for the processing-object materials is formed in an upper side face. A flange 13 is formed at an end portion of the casing 11 on its one side opposite to the side on which the gearbox 3 is provided, and an end face plate 5 is fixed to the flange 13 with bolts. A plurality of molding nozzles 53 for discharging processed processing-object materials, while molding them simultaneously, are attached to the end face plate 5. A side face of the end face plate 5 and an edge portion of the flange 13 are connected to each other with a link hinge device 51 so that with the bolts removed, the end face plate 5 can be turned by the link hinge device 51. Heaters 54 for heating the processing-object materials, and a temperature sensor 55 for detecting a temperature of the processing-object materials discharged from the molding nozzles 53, are provided in the end face plate 5.

A water injection nozzle 31 is provided at the input port 12 of the casing, and a solenoid valve 33 is interposed on a water injection pipe 32 connecting to the water injection nozzle 31. The solenoid valve 33 is connected to a control section C so as to allow water injection into the casing 11 to be effected under control by the control section C. Control contents by the control section C will be described in detail later.

In an upper side face of the casing 11, two exhaust ports 14, 14 are formed on widthwise both sides of the input port 12. The exhaust ports 14 communicate with a blower B via a duct. This blower B is so formed as to suck up an exhaust object from within the casing 11 and discharge the exhaust object out of the building in which the solidification processing apparatus is located. The exhaust object is steam generated from the processing-object materials in most part, but contains gases, liquid fine particles, powder dust and the like generated from the processing-object materials in the casing 11 as well.

Fore ends of a pair of rotating shafts 70 extending from the gearbox 3 confront one surface of the casing 11 closer to the gearbox 3, and drive shafts 72 each having a hexagonal cross section abut on fore ends of the rotating shafts 70, 70, respectively. The pair of drive shafts 72 extend parallel to each other up to proximities to the inner surface of the end face plate 5. The screw shafts 2, 2 are fitted to the pair of drive shafts 72, respectively.

Each screw shaft 2 has a shaft portion which is fitted to the drive shaft 72, and screw blade portions formed on a circumferential surface of the shaft portion. The pair of screw shafts 2, 2 fitted to the pair of drive shafts 72, 72 have screw blade portions formed in mutually opposite turns, and the screw blade portions are so placed as to overlap with each other as viewed along a direction in which the shaft portion extends. The pair of rotating shafts 70, 70 are driven into rotation in mutually opposite directions as shown by arrows A1, A2. Thus, the screw shafts 2 are driven into rotation so that the screw blade portions overlap with each other from up to down, thereby sandwiching the processing-object materials inputted within the casing 11 and transferring the materials toward the end face plate 5 while kneading and compacting the materials.

Within the gearbox 3 are housed the pair of rotating shafts 70, 70 and spur gears 71 which are provided for the pair of rotating shafts 70, 70, respectively, so as to mesh with each other. One of the pair of rotating shafts 70, 70 is connected to a coupling 4 provided in adjacency to the gearbox 3. The coupling 4 is connected to the speed reducer R so that rotating force transferred from the motor M via the transmission gear T is reduced by the speed reducer R and transferred to the one rotating shaft 70 via the coupling 4. The rotating force is transferred from the one rotating shaft 70 via the spur gear 71 to the other rotating shaft 70, so that the pair of rotating shafts 70, 70 are rotated in mutually opposite directions at an equal speed.

A cutter 6 is fitted to the flange 13 of the casing via a cutter hinge 61, and the processed processing-object materials discharged from the molding nozzles 53 of the end face plate 5 are cut by the cutter 6. The cutter 6 includes rotary knives 62, 62 which are rotated about a rotating shaft coupled to their ends to cut the processing-object materials, and a rotary knife motor 63 for driving the rotary knives 62. The cutter hinge 61 of the cutter is fixed at one edge of the end face plate 5 on its one side opposite to the side on which the link hinge device 51 is fixed, so that the cutter 6 is rotatable in a direction opposite to the direction in which the end face plate 5 is rotated. With an end portion of the casing closed by the end face plate 5, the cutter 6 is located on an outer side face of the end face plate 5. For opening of the end face plate 5, while the cutter 6 is turned to an open position as shown in FIG. 1, the end face plate 5 is turned in a direction opposite to the turning direction of the cutter 6. As a result, maintenance work of the end face plate 5, maintenance work of the screw shafts 2 within the casing 11 to be performed with the end face plate 5 opened, and maintenance work of lining pieces within the casing 11 (lining pieces will be described later), can be facilitated.

Figure 3A:
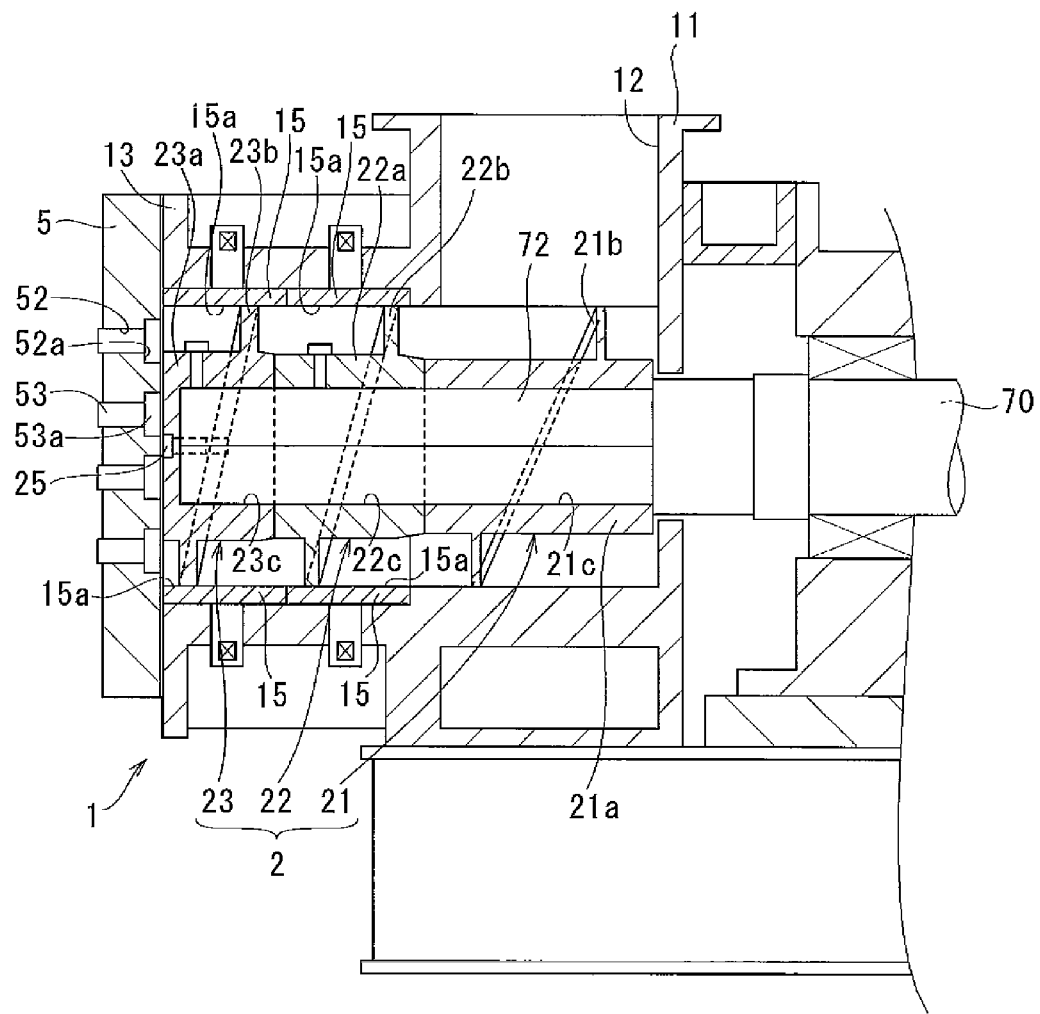
FIG. 3A is a sectional view showing inside of a main body of the solidification processing apparatus.

FIG. 3A is a sectional view showing inside of the main body 1.

Each of the pair of screw shafts 2, 2 is composed of a first screw member 21, a second screw member 22 and a third screw member 23 in an order from the input port 12 side toward the end face plate 5 side in the casing 11. The screw members 21, 22, 23 are formed of shaft portions 21a, 22a, 23a and screw blade portions 21b, 22b, 23b, respectively. In the shaft portions 21a, 22a of the first and second screw members, through holes 21c, 22c each having a hexagonal cross section for insertion of the drive shafts 72 are formed coaxial with the center axis. On the other hand, in the shaft portion 23a of the third screw member, a bottomed hole 23c having a hexagonal cross section to be fitted into a fore end portion of the drive shaft 72 is formed coaxial with the center axis. A bolt hole 24 adjoining the bottomed hole 23c is provided in an end face of the shaft portion 23a of the third screw member. To the drive shaft 72, the first and second screw members 21, 22 are attached with the through holes 21c, 22c fitted into insertion, and the third screw member 23 is also attached with the bottomed hole 23c fitted into insertion. A bolt 25 is inserted into the bolt hole 24 of the end face of the third screw member 23 and screwed to the drive shaft 72, by which the first to third screw members 21, 22, 23 are fixed to the drive shaft 72.

Figure 3B:
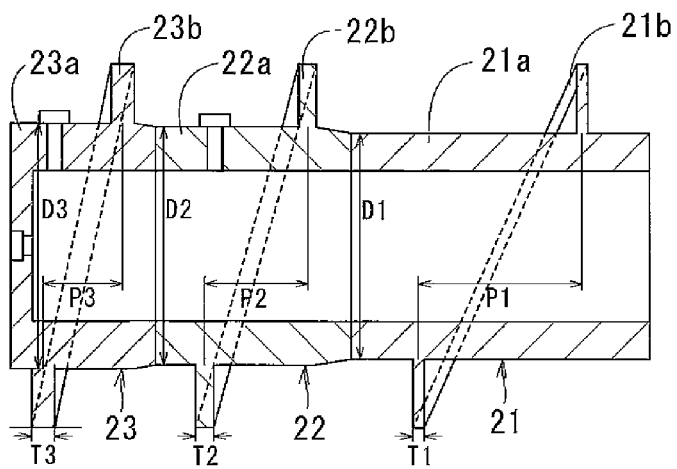
FIG. 3B is a sectional view showing first, second and third screw members constituting a screw shaft.

FIG. 3B is a sectional view showing the drawn-out first, second and third screw members 21, 22, 23 constituting the screw shaft 2. The first screw member 21, the second screw member 22 and the third screw member 23 are so formed that diameters D1, D2, D3 of the shaft portions 21a, 22a, 23a increase in this order. That is, the diameters D1, D2, D3 of the shaft portions 21a, 22a, 23a are so formed as to satisfy a relationship that D1<D2<D3. Also, pitches P1, P2, P3 of the screw blade portions 21b, 22b, 23b are so formed as to decrease in this order, having a relationship that P1>P2>P3. Further, thicknesses T1, T2, T3 of the screw blade portions 21b, 22b, 23b are so formed as to increase in this order, having a relationship that T1<T2<T3. As a result of these conditions, capacities of parts of a process chamber formed by surfaces of the screw member 21, 22, 23 and the inner surface of the casing 11 decrease in an order of the first screw member 21, the second screw member 22 and the third screw member 23. Accordingly, the first screw member 21, the second screw member 22 and the third screw member 23 are enabled to transfer the processing-object materials securely without causing any disadvantages such as bite, and yet enabled to exert progressively increasing compacting forces on the processing-object materials. A ratio of a capacity of one part of the process chamber facing the third screw member 23 to a capacity of another part of the process chamber facing the first screw member 21 is set to a ratio within a range of 1/2 to 1/3 (hereinafter, referred to as capacity reduction ratio). With use of the screw shaft 2 having such a capacity reduction ratio, wastes having a bulk specific gravity of 0.025 at input time can be compacted at discharge time by the molding nozzles 53 of the end face plate to such a level that the bulk specific gravity falls within a range of about 0.45 to 0.5. Also, wastes having a bulk specific gravity of 0.025 at input time can be compacted at discharge time from the molding nozzles 53 to such a level that their true specific gravity falls within a range of about 0.8 to 1.

An end portion of the shaft portion 22a of the second screw member on one side closer to the first screw member 21, and an end portion of the shaft portion 23a of the third screw member on one side closer to the second screw member 22, are formed so as to be tapered, respectively. As a result, when processing-object materials are transferred sequentially by the first to third screw members 21, 22, 23, the progressively increasing diameters of the shaft portions 21a, 22a, 23a cause less resistances to be given to the processing-object materials.

The first screw member 21, the second screw member 22 and the third screw member 23 are all formed by winding the screw blade portions 21b, 22b, 23b, respectively, with a number of turns being one turn. That is, one-side ends of the screw blade portions 21b, 22b, 23b of each screw member are generally equal in circumferential position to the other-side ends of the screw blade portions 21b, 22b, 23b, respectively, as viewed from the axial direction. As a result of this, manufacture of the screw members 21, 22, 23 is facilitated and moreover maintenance work such as repair and replacement of the screw members 21, 22, 23 becomes easy to execute.

Figure 4A:
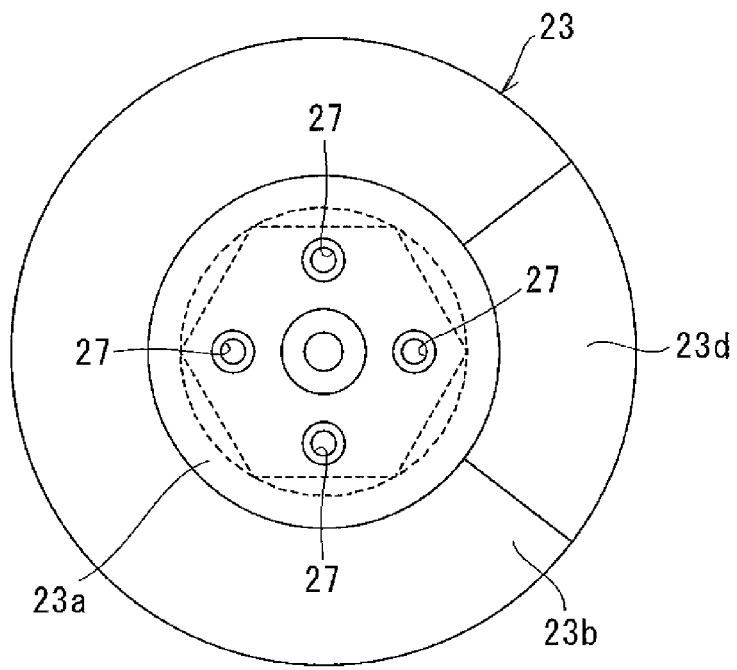
FIG. 4A is a front view showing a third screw member.
Figure 4B:
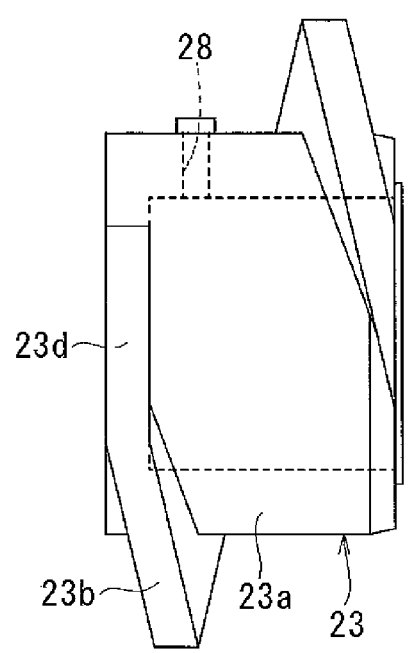
FIG. 4B is a side view showing the third screw member.

FIG. 4A is a front view showing the third screw member 23, and FIG. 4B is a side view showing the third screw member 23. In FIG. 4B, the left side is the front side and placed in proximity to the inner surface of the end face plate 5. As shown in FIGS. 4A and 4B, the third screw member 23 has a planar portion 23d which adjoins an end of the screw blade portion 23b and which is formed generally perpendicular to a center axis of the shaft portion 23a. By rotationally driving the planar portion 23d in proximity to the inner surface of the end face plate 5, the processing-object materials compacted into high density are securely extruded from the molding nozzles 53 of the end face plate 5. The third screw member 23 applies to the processing-object materials the largest compacting force out of compacting forces applied by the screw members 21, 22, 23, thus the third screw member 23 being larger in abrasion wear and more liable to chipping due to metal pieces or the like mixed in the processing-object materials than the other screw members. Therefore, the third screw member 23 is made up of a base portion formed from chrome steel, and an overlay portion formed by welding on the surface of the base portion. The overlay portion is preferably formed by using a wear-resistant material such as tungsten carbide-based material.

Also, the third screw member 23 has an oil hole 28 radially extending in the shaft portion 23a, so that lubricating oil is supplied through the oil hole 28 to between the bottomed hole 23c of the shaft portion 23a and the drive shafts 72. As the lubricating oil, graphite grease is preferably used. As a result, in spite of large compacting force applied to the processing-object materials, occurrence of such disadvantages as stress corrosion, sticking, and bite of fine particles of the processing-object materials between the shaft portion 23a of the third screw member and the drive shafts 72 can be prevented. Also for the first and second screw members 21, 22, lubricating oil is fed through oil holes formed in the screw members, respectively, to between the individual screw members and the drive shafts 72 as in the case of the third screw member 23.

The third screw member 23 further has four jackscrew holes 27 in the end face of the shaft portion 23a. Screwing jackscrews to the jackscrew holes 27 and applying force to the end face of the drive shaft 72 allows the third screw member 23 to be easily pulled out from the drive shaft 72.

Figure 5:
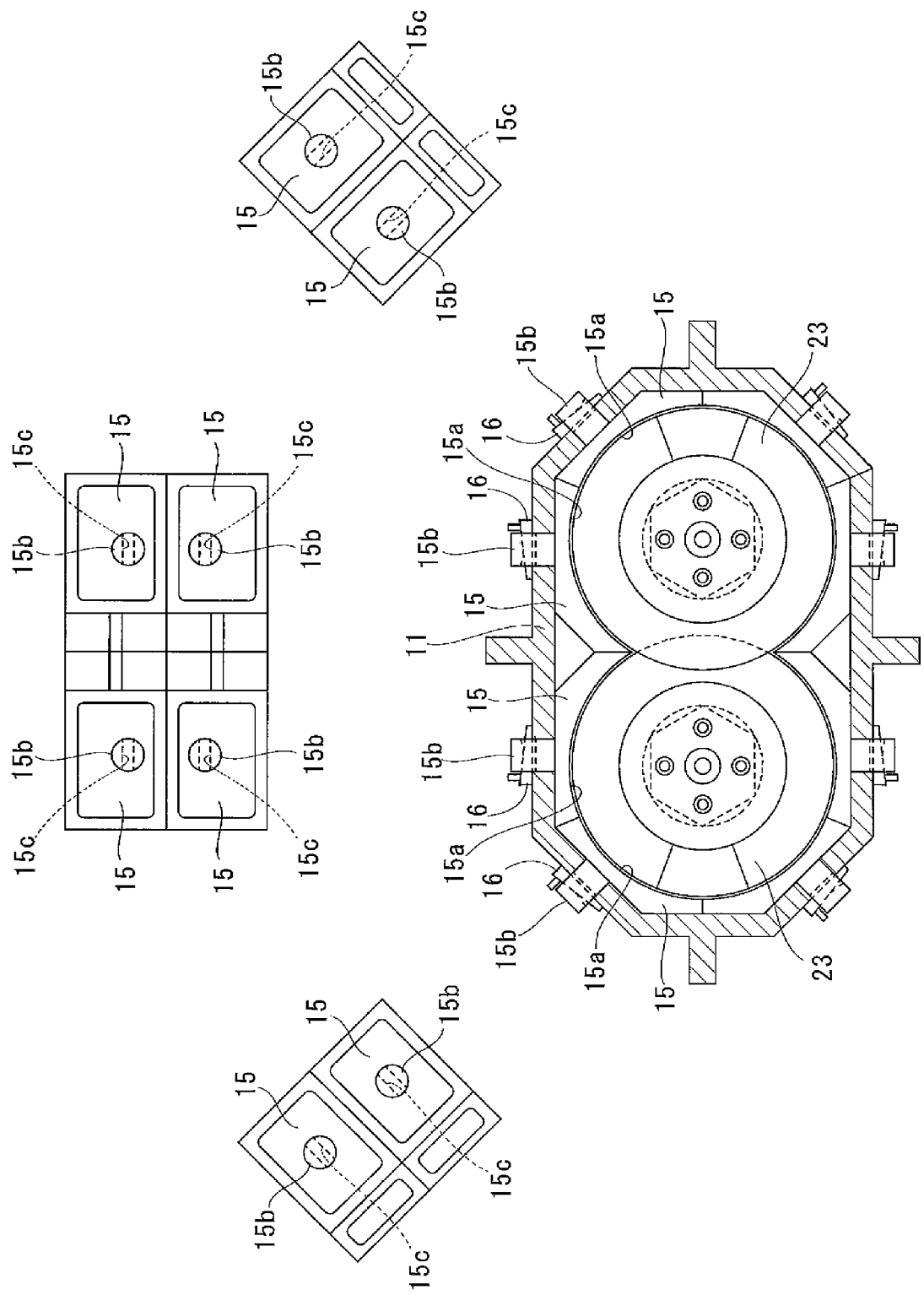
FIG. 5 is a sectional view showing inside of the casing as well as lining pieces to be placed within the casing.

FIG. 5 is a sectional view showing inside of the casing 11. Within the casing 11 are placed a plurality of lining pieces 15, 15, . . . surrounding the second and third screw members 22, 23. A process chamber for processing-object materials is formed between the plurality of lining pieces 15 and outer surfaces of the second and third screw members 22, 23. The lining pieces 15 are provided eight in number along a direction perpendicular to the axis of the second and third screw members 22, 23 as well as two in arrays along the axial direction of the second and third screw members 22, 23. The axial two arrays of lining pieces 15 are composed of one array extending generally along the circumference of the second screw member 22 and the other array extending generally along the circumference of the third screw member 23. In FIG. 5, out of eight faces of the casing 11 having an octagonal cross section, lining pieces 15 located in upper-half four faces are extracted and an aspect as viewed along normal directions of the individual faces of the casing 11 is illustrated on extension sides of the normal lines.

Each of the lining pieces 15 has a wall surface portion 15a whose one surface confronts an edge of the screw blade portion 22b, 23b of the second or third screw member, a protruding portion 15b which is formed in the other surface of the wall surface portion 15a so as to protrude along the normal direction, and a wedge hole 15c which is provided near a forward end of the protruding portion 15b. The wall surface portion 15a of each lining piece is formed from wear-resistant steel. The lining pieces 15 are placed inside the casing 11 with their protruding portions 15b protruding outside from through holes formed in the casing 11. Wedges 16 are inserted from outside of the casing 11 into the wedge holes 15c of the protruding portions 15b protruding outside the casing 11, respectively, so that the lining pieces 15 are fixed to the casing 11. As a result, the lining pieces 15 can be easily fitted to and removed from within the casing 11 with a simple structure. In particular, lining pieces 15 around the third screw member 23 are more liable to occurrence of wear and chipping because processing-object materials coming into contact with one surface of the wall surface portion 15a are subjected to higher compacting forces. However, since the lining pieces 15 are easy to fit and remove, their maintenance work such as repair and replacement can be easily carried out.

Figure 6A:
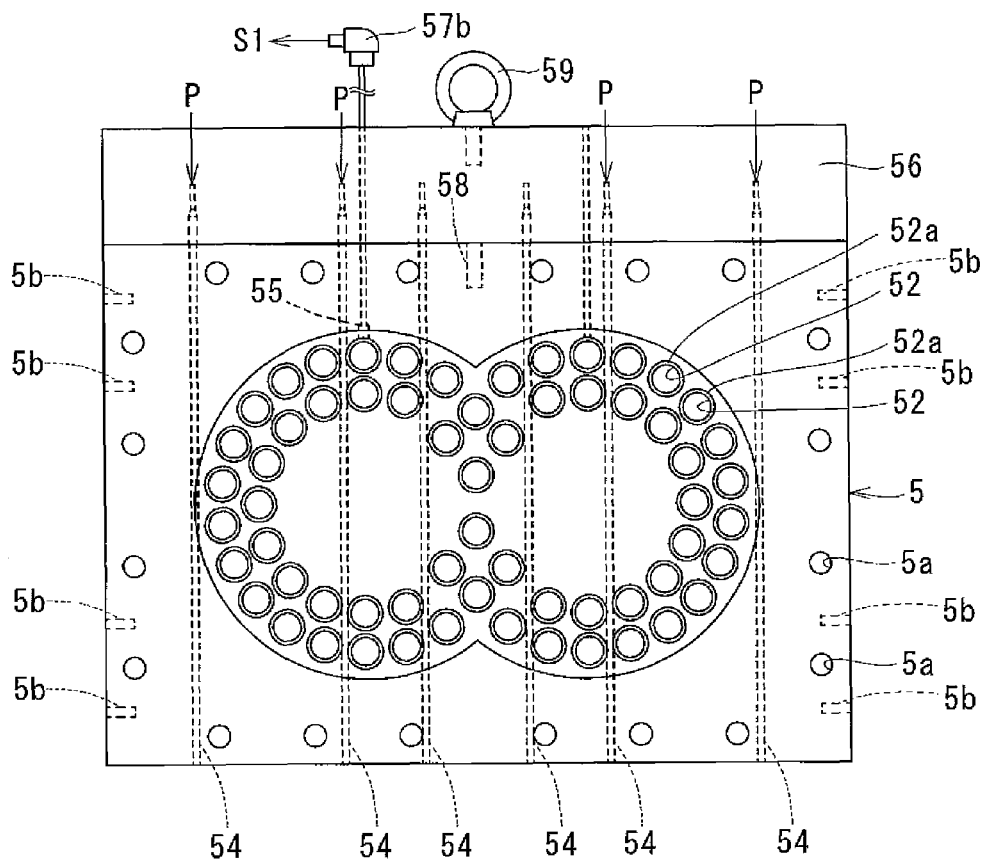
FIG. 6A is a front view showing an end face plate.
Figure 6B:
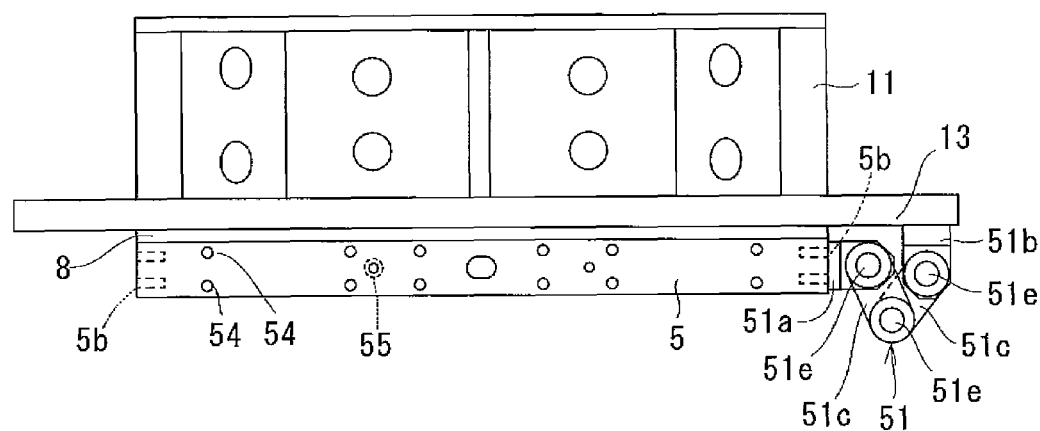
FIG. 6B is a plan view showing an aspect that the end face plate is attached to an end portion of the casing.
Figure 6C:
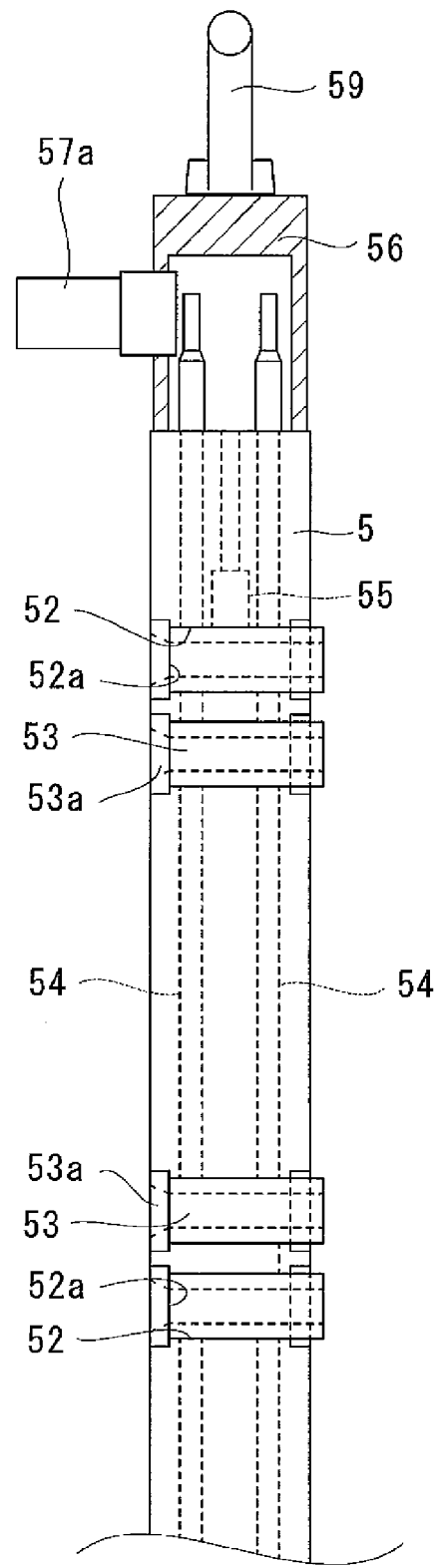
FIG. 6C is a side view showing the end face plate.

FIG. 6A is a front view showing the end face plate 5, FIG. 6B is a plan view showing an aspect that the end face plate 5 is attached to an end portion of the casing 11, and FIG. 6C is a side view showing the end face plate 5.

The end face plate 5, as shown in FIG. 6A, has a plurality of discharge holes 52, 52, . . . provided in an area along which the planar portion 23d of the third screw member extend in proximity thereto. The molding nozzles 53 are inserted into the discharge holes 52, respectively, as shown in FIG. 6C. A step portion 52a is formed at openings of each discharge hole 52 on both front and back sides thereof, and a flange 53a provided at an end portion of the molding nozzle 53 is engaged with the step portions 52a of the discharge hole, by which the molding nozzle 53 is fitted to the discharge hole 52. As shown in FIG. 3A, the molding nozzle 53 is attached in the discharge hole 52 with the flange 53a directed toward inside of the casing 11. A forward end portion of the molding nozzle 53 protrudes over a length of 5 mm-10 mm outward from the surface of the end face plate 5. The end face plate 5, in which through holes 5a are provided over its entire periphery, is fixed to the flange 13 of the casing with bolts inserted into the through holes 5a.

Linear-shaped heaters 54 extending up and down are contained in the end face plate 5. These heaters 54 are resistance-heating type heaters for fulfilling heating by electric resistance. The heaters 54 are arranged in six lines in the widthwise direction, and in two lines in the thicknesswise direction each at the individual widthwise placement positions. As to placement intervals of the six-line heaters 54 in the widthwise direction, placement intervals of central four lines are generally equal to one another while placement intervals of outermost lines on both sides are larger than those of the central four arrays. By this arrangement, with respect to the widthwise direction of the end face plate 5, a quantity of heating applied to central portion which is larger in the number of discharge holes 52 and therefore larger in pass quantity of processing-object materials is made larger than a quantity of heating applied to both side portions which are smaller in the number of discharge holes 52 and therefore smaller in pass quantity of processing-object materials. Thus, the quantity of heating per unit volume of processing-object materials is generally uniformized over the widthwise direction of the end face plate 5.

Further, with the two-line placement of the heaters 54 in the thicknesswise direction of the end face plate 5, heating characteristics of processing-object materials can be kept almost unchanged even when the fitting surface is interchanged between front-and-rear two surfaces as described later. Also when one of the heaters 54 in the thicknesswise direction has failed, the processing-object materials can be heated by the other heater 54 so that the heating function reliability can be improved.

The end face plate 5 is provided with a temperature sensor 55. More specifically, a temperature sensor 55 is placed inside the end face plate 5 so that a heat receiving portion is exposed in an inner surface of a specified discharge hole 52 out of the plurality of discharge holes 52. By this temperature sensor 55, temperature of processed processing-object materials extruded from within the casing 11 is detected. The temperature sensor 55 is connected to the control section C. Alternatively, a sleeve-like temperature sensor 55 may be fitted into an outer surface of a molding nozzle 53 protruding from the end face plate 5. Further, a plate-like temperature sensor may be fixed at a forward end portion of a molding nozzle 53 with a band or the like. Otherwise, temperature of the processing-object materials discharged from the molding nozzle 53 and dropped into a downward bucket may be detected by an infrared temperature sensor. In brief, it is required only that the temperature of the processing-object materials processed by the screw shafts 2 can be detected.

Based on a signal S1 from the temperature sensor 55, the control section C controls operation of the solenoid valve 33 of the water injection pipe. More specifically, upon reception of a signal S1 from the temperature sensor 55, the control section C, if having detected that the temperature of the processing-object materials is over 120° C., then transmits a control signal W to the solenoid valve 33, where the solenoid valve 33 having received the control signal W is opened to allow water to be injected into the casing 11. As a result, the temperature of the processing-object materials within the casing 11 is lowered, so that disadvantages such as inflammation or generation of toxic gas can be prevented. Meanwhile, upon reception of the signal S1 from the temperature sensor 55, the control section C, if having detected that the temperature of processing-object materials has lowered below 120° C., then transmits the control signal W to close the solenoid valve 33, where the water injection into the casing 11 is stopped. By performing water injection control based on the temperature sensor 55 as shown above, the temperature of the processing-object materials is controlled so as to be kept within a temperature range of generally 100° C. to 140° C.

In addition, the temperature and temperature range as references for performing the control of the solenoid valve 33 may be changed, as required, according to the composition and water content of processing-object materials. For example, with a water content of about 15 wt % in the processing-object materials, the temperature is controlled to a range of 100° C. to 140° C. as described above, while with a water content of 20 wt % or more in the processing-object materials, the temperature of processing-object materials is controlled to a range of 120° C. to 180° C. As a result, in the process of kneading and compacting the processing-object materials by the screw shafts 2, a disadvantage of inflammation of processing-object materials due to heat generation involved in the compaction or to heating by the heaters can be prevented. Further, in the process of kneading and compacting the processing-object materials, water contents can properly be removed in the form of heated steam, so that deterioration of the flammability of solidified materials used as a fuel can be prevented.

The control for closing the solenoid valve 33 does not necessarily need to be performed based on a detected temperature of the temperature sensor 55. It is also allowable, for example, to start time count upon opening of the solenoid valve 33 and perform the control for closing the solenoid valve 33 at the time when a specified time has elapsed.

The control section C, upon receiving a start-up signal S2 for commanding a start-up of the solidification processing apparatus, performs control for starting up the heaters 54. This allows processing-object materials remaining in the molding nozzles 53 to be melted at an end of the preceding operation, so that processing-object materials after the process can promptly be discharged from the molding nozzles 53 even immediately after the start-up.

Also, the control section C, upon receiving a stop signal S3 for commanding a stop of the solidification processing apparatus, transmits a control signal W to the solenoid valve 33 to open the solenoid valve 33 so that water is injected into the casing 11. Simultaneously with the opening control for the solenoid valve 33, the control section C starts time count and, after a specified time elapse, transmits a control signal W to close the solenoid valve 33. Subsequently, the control section C stops the driving of the screw shafts 2 by the motor M, by which the operation of the solidification processing apparatus is ended. As a result, the operation can be stopped in a state that the processing-object materials within the casing 11 have been softened. Accordingly, such disadvantage as difficulty in driving the screw shafts 2 or increases in the load on the motor M due to solidified processing-object materials at a next-time operation start can be prevented.

A terminal case 56 is attached at an upper end of the end face plate 5. The terminal case 56 houses a power connecting line connected to the twelve heaters 54, and a connector 57*a* adjoining the power connecting lines is provided on a side face of the terminal case 56. The terminal case 56 also houses a signal connecting line connected to the temperature sensor 55, and a connector 57*b* adjoining the signal connecting line is provided at an upper end. Also, the terminal case 56 is connected to an upper end of the end face plate 5 with a hanging bolt 58, where hanging an eyebolt 59 fixed to a top surface of the terminal case 56 allows the end face plate 5 to be hung down via the hanging bolt 58. It is noted that the terminal case 56 is not shown in FIG. 6B.

The link hinge device 51 for turnably connecting the end face plate 5 to the flange 13 of the casing is formed so as to include a link mechanism. More specifically, the link hinge device 51 is so formed that, as shown in FIG. 6B, an end-face-plate side metal fitting 51*a* fixed to a side face of the end face plate 5 and a flange-side metal fitting 51*b* fixed near an edge of the front face of the flange 13 are connected to each other with two intermediate arms 51*c*, 51*c*. The end-face-plate side metal fitting 51*a* and one intermediate arm 51*c*, the two intermediate arms 51*c* and 51*c*, and the other intermediate arm 51*c* and the flange-side metal fitting 51*b*, are turnably connected to each other by pins 51*e*, respectively. In this link hinge device 51, while the angle between the two intermediate arms 51*c*, 51*c* is varied, one intermediate arm 51*c* is turned against the end-face-plate side metal fitting 51*a*, and the other intermediate arm 51*c* is turned against the flange-side metal fitting 51*b*. As a result of this, the end face plate 5 is turnable and horizontally movable in the thicknesswise direction. Since the end face plate 5 is formed horizontally movable in the thicknesswise direction, the end face plate 5 can be fixed to the flange 13 while a frame-like spacer is sandwiched between the flange 13 of the casing and the end face plate 5. In addition, in a case where the end face plate 5 is fitted to the flange 13 of the casing with a hinge having only the turning function, an attempt to fix the end face plate 5 to the flange 13 with a spacer sandwiched therebetween would encounter a difficulty that far portions of the end face plate 5 from the hinge could not be put into close contact with the flange 13 due to the thickness of the spacer.

Figure 7:
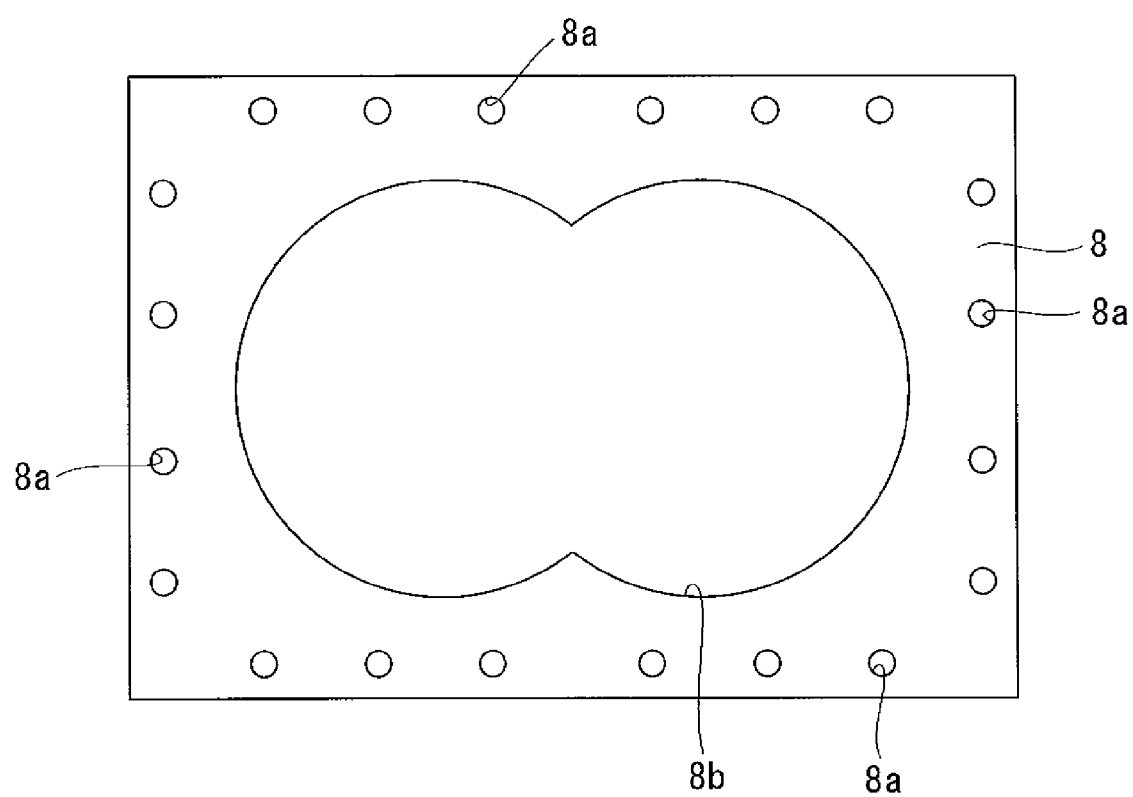
FIG. 7 is a front view showing a spacer.
Figure 8:
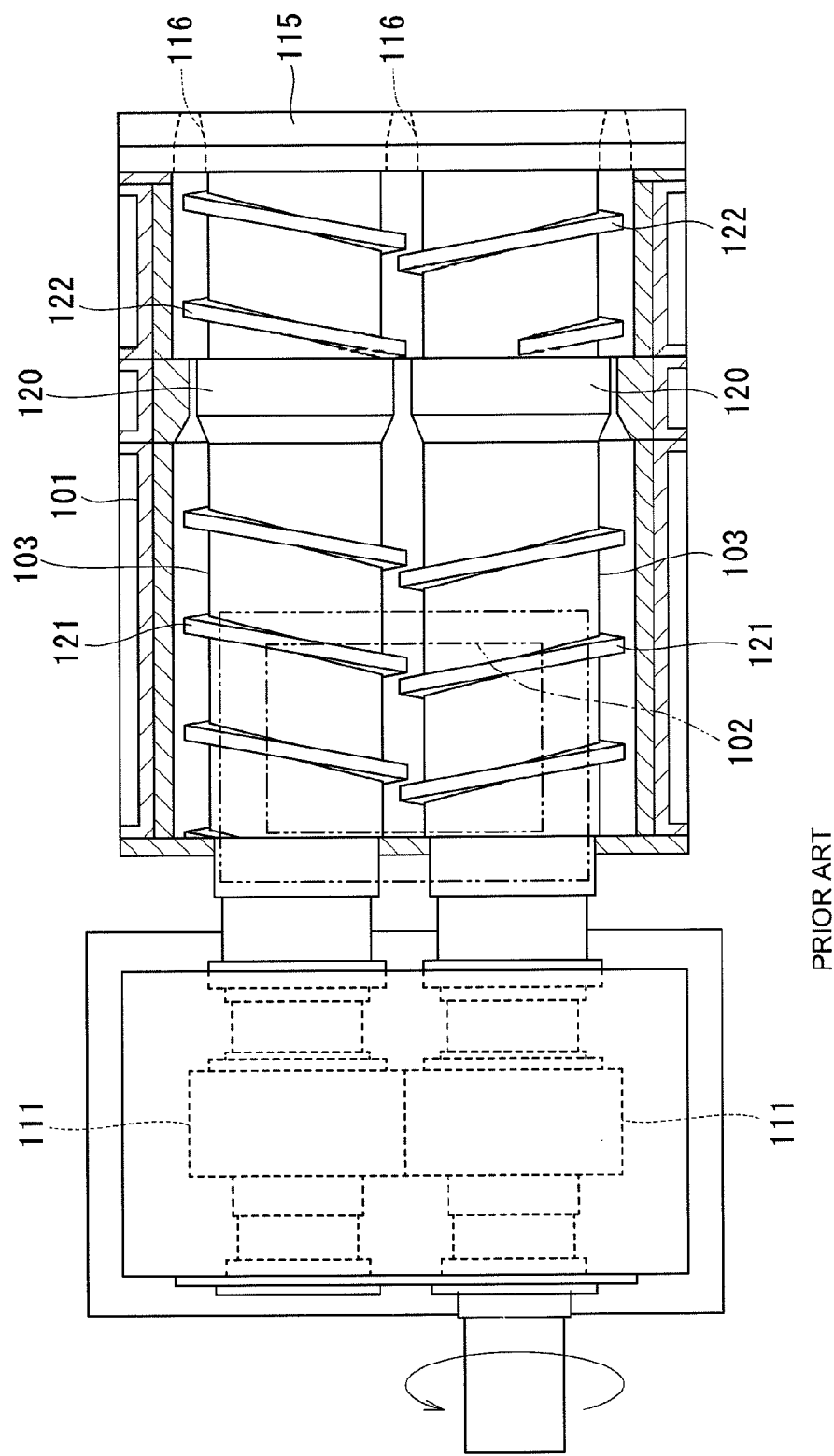
FIG. 8 is a view showing a solid regenerated fuel manufacturing apparatus according to a prior art.

FIG. 7 is a front view showing a spacer 8 to be sandwiched between the end face plate 5 and the flange 13 of the casing. The spacer 8 has outer-edge dimensions generally equal to outer-edge dimensions of the end face plate 5, and through holes 8*a* are provided at such positions as to adjoin the through holes 5*a* when the spacer 8 is overlapped with the end face plate 5. In a center of the spacer 8 is provided a calabash-shaped cutout portion 8*b* which is cut out over a slightly wider range than an area over which the planar portion 23*d* of the third screw member draws a turning track in opposition to the spacer 8. With this spacer 8 sandwiched between the end face plate 5 and the flange 13 of the casing, bolts are inserted into the through holes 5*a* of the end face plate and the through holes 8*a* of the spacer, by which the end face plate 5 and the spacer 8 are fixed to the flange 13. By the use of the spacer 8, a clearance between a surface (fitting surface) of the end face plate 5 confronting the inside of the casing 11 and the planar portion 23*d* of the third screw member within the casing 11 can be adjusted with high accuracy. Also, attaching the spacer 8 in early stages of operation and removing the spacer 8 after reach of a specified wear extent due to the operation allows the end face plate 5 to continue to be used until a specified extent of wear is reached even after the removal of the spacer 8, so that the end face plate 5 becomes usable over a prolonged time period.

The end face plate 5 has, on its both side faces, a plurality of bolt holes 5*b*, 5*b*, ... to which the end-face-plate side metal fitting 51*a* is fitted. Also, in the end face plate 5, the step portions 52*a* at which the flange 53*a* of the molding nozzles is to be engaged with the discharge holes 52 are formed in front-and-rear both sides of the end face plate 5. As a result of this, the fitting surface of the end face plate 5, which is to be fitted toward inside of the casing 11, is interchangeable between its front-and-rear both sides. Accordingly, the end face plate 5, which can be used with both sides interchanged, can be given relatively longer service life notwithstanding its relatively large wear extent due to subjection to high compacting force of the processing-object materials by the third screw member 23. Particularly with the use of the spacer 8, the service life of the end face plate 5 can be prolonged effectively.

The solidification processing apparatus having the above-described construction operates as described below.

First, a start-up switch of the solidification processing apparatus is depressed by an operator, by which operation is started. Along with the depression of the start-up switch, a start-up signal S2 is outputted from a control unit of the solidification processing apparatus to the control section C. The control section C, receiving the start-up signal S2, feeds electric power P to the heaters 54 of the end face plate to exert preliminary heating of the end face plate 5. By this process, solidified processing-object materials remaining in the molding nozzles 53 at an end of the preceding operation are melted.

Subsequently, the motor M is started up under control by the control unit, and rotating force of the motor M is transferred via the transmission gear T, the speed reducer R and the coupling 4 to the rotating shafts 70. The pair of rotating shafts 70 within the gearbox 3 are rotated in mutually opposite directions, and the pair of screw shafts 2, 2 fitted to the drive shafts 72 connecting to the rotating shafts 70 are rotated in mutually opposite directions within the casing 11. The pair of screw shafts 2, 2 are rotated in directions toward the widthwise inside as viewed in a plan view, as well as in directions from up to down as viewed in a front view. The screw shafts 2 are preferably rotated at a relatively low speed of 30 rpm (revolutions per minute) to 60 rpm.

Further, the blower B is started up, by which exhaust inside the casing 11 via ducts connected to the exhaust ports 14 is started.

As the drive of the main body 1 is started in this way, input of processing-object materials through the input port 12 of the casing 11 is started. The processing-object materials are preferably a mixture of plastics or other melting materials and paper or other non-melting materials. In particular, the processing-object materials, preferably, have a constituent material ratio that melting materials occupy 40 to 60 wt % (weight percentage) while non-melting materials occupy 30 to 40 wt %. The rest of the constituent materials may be water or those composed primarily of water such as garbage.

In the casing 11, the input processing-object materials are sandwiched and kneaded, and securely transferred toward the second screw member 22 side, by the pair of first screw members 21 with a strong sandwiching force. By the second screw members 22, the processing-object materials are guided into the process chamber formed between the second screw members 22 and the lining pieces 15, where the processing-object materials are subjected to kneading and compaction. Since the processing-object materials guided into the process chamber are kneaded and compacted while being fed toward the end face plate 5 side by rotating operation of the second screw members 22, backflow of the processing-object materials can be prevented effectively. Subsequently, the third screw members 23 guide the processing-object materials into the process chamber formed between the third screw members 23 and the lining pieces 15, where the processing-object materials are subjected to further kneading and compaction. The first, second and third screw member 21, 22, 23 are so formed that, in this order, diameters D1, D2, D3 of their shaft portions 21a, 22a, 23a, respectively, increase, pitches P1, P2, P3 of their screw blade portions 21b, 22b, 23b, respectively, increase, and that thicknesses T1, T2, T3 of their screw blade portions 21b, 22b, 23b, respectively, increase. Therefore, the processing-object materials can be kneaded and compacted effectively without such disadvantages as bite, density decrease or the like of the processing-object materials.

Also, since the first, second and third screw members 21, 22, 23 apply increasingly larger compacting forces, respectively, to the processing-object materials to do kneading, compacting heat and frictional heat can effectively be generated on the processing-object materials. Thus, melting materials such as plastics contained in the processing-object materials can effectively be melted. These compacting heat and frictional heat can effectively be generated on condition that melting materials occupy 40 to 60 wt % and non-melting materials occupy 30 to 40 wt % in the processing-object materials as described above. Thus, since melting materials can be melted enough by compacting heat and frictional heat of the processing-object materials, heaters do not need to be provided on the side face of the casing 11 as would be involved in the prior art. That is, melting materials of the processing-object materials can be melted enough by preliminarily heating with the heaters 54 of the end face plate 5.

In the solidification processing apparatus of this embodiment, the temperature of the processing-object materials is efficiently increased by kneading and compacting operations with the first to third screw members 21, 22, 23 as well as by the heating with the heaters 54. In this connection, in some cases, the temperature may rapidly increase due to reasons, for example, that the composition of the processing-object materials inputted through the input port 12 is changed so that the ratio of non-melting materials is increased. In this case, upon detection by the temperature sensor 55 that the temperature of the processing-object materials has exceeded 120° C., the control section C, based on the signal S1 derived from the temperature sensor 55, outputs the control signal W to open the solenoid valve 33. This causes such control to be exerted that water is fed from the water injection nozzle 31 into the casing 11, causing the temperature of the processing-object materials to be lowered so that the temperature of processing-object materials discharged from the discharge holes 52 of the end face plate becomes 140° C. or lower. Thus, such disadvantages as inflammation of the processing-object materials due to high temperatures, occurrence of incomplete combustion, and generation of chlorine gas or other toxic gases can be prevented.

When water is injected into the casing 11, compacting heat and frictional heat of the processing-object materials or heat of the heaters 54 causes water contents to be evaporated, thereby producing water steam. Particularly around the third screw members 23, which is closer to the heaters 54 and larger in compacting force onto the processing-object materials, high-temperature, high-pressure steam is produced. This steam is sucked up by the blower B through the exhaust ports 14 formed on both sides of the input port 12 of the casing, and discharged out of the building. As a result of this, such disadvantages as that the interior of the casing 11 comes to an abnormal high pressure to damage oil seals provided around the rotating shafts 70 can effectively be prevented. Also, since the exhaust inside the casing 11 is effected through the exhaust ports 14, 14 provided on both sides of the input port 12, the extent to which the suction flow is disturbed by the processing-object materials inputted through the input port 12 can be reduced, so that the exhaust can be fulfilled at good efficiency. Further, in the casing 11, since the exhaust is fulfilled in a direction opposite to the direction in which the processing-object materials are transferred by the screw shafts 2, 2, the disadvantage that steam may be mixed into the processing-object materials discharged from the molding nozzles 53 of the discharge holes in the end face plate can be prevented.

During the process of water injection into the casing 11, when a drop of temperature of the processing-object materials below 120° C. is detected upon reception of the signal S1 from the temperature sensor 55, the control section C outputs the control signal W to close the solenoid valve 33, thereby stopping the water injection. As a result, the disadvantage that the processing-object materials go lower in temperature so that solidified materials go lower in shape retention can be prevented.

In the above-described case, under the condition that a reference temperature of the processing-object materials for controlling the solenoid valve 33 is assumed as 120° C., the control section C exerts opening control over the solenoid valve 33 for temperatures exceeding the reference temperature, and exerts closing control over the solenoid valve 33 for temperatures below the reference temperature. However, with a plurality of reference temperatures set, the degree of opening of the solenoid valve 33 may be changed stepwise at the individual reference temperatures. In brief, it is enough that the temperature of the processing-object materials can be controlled so as to fall within a predetermined temperature range by performing control of the water injection quantity from the water injection nozzle 31.

Alternatively, the control section C may control the electric power P for the heaters 54 based on the signal S1 from the temperature sensor 55 so that the temperature of the processing-object materials falls within a specified temperature range.

The processing-object materials guided by the third screw members 23 and compacted with high pressure are extruded in a bar-like shape from the molding nozzles 53 of the end face plate 5 with the melting materials in a molten state. The extruded bar-like processing-object materials are cut into specified lengths by the cutter 6, and dropped into the bucket placed below, thus being collected. Out of the bar-like processing-object materials cut into the specified lengths, melting materials are solidified along with drops of the temperature, resulting in a solid regenerated fuel. The solid regenerated fuel obtained in this way has a heating value of 5000-6000 cal/g, being usable as a fuel.

When the operation of the solidification processing apparatus is stopped, the control section C, which has received the stop signal S3, transmits the control signal W to open the solenoid valve 33, thereby performing water injection into the casing 11. The control section C starts time count simultaneously with the opening control for the solenoid valve 33, and closes the solenoid valve 33 after a 3-minute elapse since the start of the time count. Thereafter, the control section C stops the motor M to stop the rotation of the screw shafts 2. By stopping the operation in a state that the processing-object materials within the casing 11 have been softened, such disadvantage as difficulty in driving the screw shafts 2 or increases in the load on the motor M due to solidified processing-object materials at a next-time operation start can be prevented. In addition, the time duration of keeping the water injection upon reception of the stop signal S3 is not limited to 3 minutes, and may be changed as required according to the constituent materials of the processing-object materials and the like.

In the solidification processing apparatus of this embodiment, since compacting forces higher than conventional ones are applied to the processing-object materials by the screw shafts 2, there is a tendency that more frequent maintenances tend to be required than it has been conventionally. Therefore, by facilitating the maintenance of the screw shafts 2, the end face plate 5 and the lining pieces 15, working and cost burdens for the maintenance are reduced. For example, when a predetermined maintenance time has come up, maintenance work is carried out as described below.

First, the cutter 6 positioned on the front side of the end face plate 5 is turned about the cutter hinge 61 so as to be set to the open position shown in FIG. 1. Subsequently, the bolts that fix the end face plate 5 and the flange 13 of the casing are removed, and the end face plate 5 is turned about the link hinge device 51. Since the cutter 6 is positioned on one side opposite to the side on which the end face plate 5 is turned, the turning work of the end face plate 5 is easily achievable. The end face plate 5 has a thickness of 10 cm or more and a weight of 2 to 3 tons in order to withstand high compacting forces applied to the processing-object materials. Thus, with the terminal case 56 attached to the end face plate 5 and with a hanging metal fitting hung on the eyebolt 59 of the terminal case 56, the end face plate 5 is processed while being supported by a chain block, crane, or the like. In addition, the eyebolt may also be fixed directly to an upper end of the end face plate 5 so as to allow the hanging metal fitting to be hung therefrom.

Subsequently, maintenance work for the screw shafts 2 or the lining pieces 15 in the casing 11 is carried out. More specifically, wear extents of the second and third screw members 22, 23, wear extents of the lining pieces 15, and wear extents of the inner surface of the end face plate 5 are checked. When the wear extents are beyond specified values, overlay repairing of the screw blade portions 22*b*, 23*b* of the second and third screw members, or overlay repairing of the end face and planar portion 23*d* of the shaft portion 23*a* of the third screw member, is carried out. In the case of repairing of the second and third screw members 22, 23, jackscrews are fitted to the jackscrew holes 27 of the third screw members 23, by which pull-out force is applied to the drive shafts 72 by the jackscrews. This allows the third screw members 23 to be easily pulled out from the drive shafts 72, so that the second screw members 22 can thereafter be easily removed from the drive shafts 72. Since graphite grease is supplied to between the screw members 21, 22, 23 and the drive shafts 72, the second and third screw members 22, 23 can be easily removed.

Further, when the wear extents of lining pieces 15 surrounding the second and third screw members 22, 23 have exceeded a specified reference value, the lining pieces 15 are replaced with other ones. In particular, lining pieces 15 surrounding the third screw member 23, which apply larger compacting force to the processing-object materials, are larger in wear extent. The lining pieces 15 can be easily replaced by removing the wedges 16 on the outer surface of the casing 11.

When the wear extent of the inner surface of the end face plate 5 has exceeded a specified reference value, overlay repairing or replacement of the end face plate 5 is performed. Since the planar portion 23*d* of the third screw member is rotated in proximity to a region of the end face plate 5 where the discharge holes 52 are formed, this region is subject to particularly large wear extents. For the replacement of the end face plate 5, its fitting surface to face the inside of the casing 11 may be interchanged between front-and-rear faces. In conducting the replacement of the fitting surface of the end face plate 5, the end-face-plate side metal fitting 51*a* fitted to the bolt holes 5*b* on one side face is removed.

Subsequently, the end face plate 5 is turned 180° horizontally, where the end-face-plate side metal fitting 51*a* is fitted to bolt holes 5*b* on the other side face. The end face plate 5 is turned about the link hinge device 51, the surface that has so far been confronting the outside of the casing 11 is put into close contact with the flange 13 so as to face the inside of the casing 11, and bolts are inserted into the through holes 5*a* for fixation to the flange 13. In a case where both surfaces of the end face plate 5 have worn out, the end face plate 5 is replaced with a new one. Thus, the end face plate 5, although relatively larger in wear extent because of its giving high compacting force to the processing-object materials, is yet usable over a relatively long period by virtue of the overlay repairing and the use of the front-and-rear surfaces. Further, by the use of the spacer 8, the service life of the end face plate 5 can effectively be prolonged. Thus, the prolonged service life of the end face plate 5 allows the maintenance cost to be reduced.

Although the solenoid valve 33 is controlled based on the signal S1 derived from the temperature sensor 55 in this embodiment, the solenoid valve 33 may also be controlled based on the load for the motor M. More specifically, when the screw shafts 2 has large drive resistance due to a large ratio of non-melting materials in the processing-object materials or other reasons, the load for the motor M is increased. This increase in the load for the motor M is detected by the supply power, the rotating speed of the rotor or the like, and the solenoid valve 33 is controlled for opening when the load for the motor M has exceeded the specified reference value. Thus, the water content in the processing-object materials within the casing 11 is increased and the drive resistance of the screw shafts 2 is reduced, so that the load for the motor M can be reduced.

Further, wastes containing thermoplastics, which are melting materials, and paper refuse and wood refuse, which are non-melting materials, are processed as an example of the processing-object materials in this embodiment. However, the plastics may include plastics other than thermoplastic ones, the paper refuse may be those originating from other than waste paper, and the wood refuse may be those originating from other than waste wood. Moreover, the processing-object materials may contain non-melting materials other than paper refuse and wood refuse, i.e., may contain non-melting materials such as wood, fiber or animal/vegetable residua. The non-melting materials may contain inorganic matters without being limited to organic matters. The non-melting materials also may contain iron powder or other metals. By solidifying processing-object materials in which metals are contained in the non-melting materials, solidified fuels of large specific gravity can be obtained. In particular, solidified fuels resulting from the process of processing-object materials in which iron powder is contained in the non-melting materials can be utilized for manufacture of iron and steel. That is, when solidified fuels containing iron powder are inputted into an electric furnace so as to react with pig iron, reduction of the pig iron can be achieved. Thus, iron and steel can be manufactured by electric furnace without using any steel converter.

Further, the non-melting materials in the processing-object materials may be, for example, toner of printing machines, incinerated ash or fly ash collected by dust collectors of boilers, sludge discharged from paper mills or the like, or sludge discharged from sewage/wastewater treatment equipment or the like. Preferably, the sludge, after being pre-treated by reduction of water content or fermentation or the like, is processed by the solidification processing apparatus of this embodiment.

The processing-object materials may also be agricultural wastes in which melting materials and non-melting materials are mixed. This kind of agricultural waste is, for example, one containing nets and racks made of synthetic resin with plants entangled to the nets and racks. One of such plants is climbing plants exemplified by hop. According to the solidification processing apparatus of this embodiment, these kinds of agricultural wastes can be subjected to solidification processing, as they are, without requiring time and labor for classifying them into nets and plants, by which solidified fuels can be obtained.

What is claimed is:

1. A solidification processing apparatus for kneading and compacting processing-object materials containing at least thermoplastics and paper refuse or wood refuse to manufacture solid fuels, the apparatus comprising:
a casing having an input port through which processing-object materials are to be inputted;
a pair of rotation driving shafts which are placed in the casing and which are rotationally driven in mutually opposite directions;
screw shafts which are removably fitted to the pair of rotation driving shafts, respectively, and each of which has a first screw member for sandwiching processing-object materials inputted through the input port and feeding the processing-object materials toward an end face side of the casing, a second screw member for, while preventing backflow, compacting the processing-object materials, and a third screw member for further compacting the processing-object materials and extruding the processing-object materials out of the casing;
an end face plate which is removably fitted to an end face of the casing and which has discharge holes for discharging the processing-object materials extruded by the third screw member;
heaters provided on the end face plate;
a water injection section for performing water injection into the casing;
exhaust ports formed in the casing;
a blower which is connected to the exhaust port to exhaust inside of the casing;
a temperature sensor for detecting a temperature of the processing-object materials processed by the screw shafts; and
a control section for, based on a signal derived from the temperature sensor, controlling quantity of water injected by the water injection section,
wherein outer diameters of shaft portions of the first, second and third screw members are configured in a sequentially increasing manner, and the exhaust ports are placed on widthwise both sides of the input port.

2. The solidification processing apparatus as claimed in claim 1, wherein the control section starts water injection by the water injection section when the temperature of the processing-object materials comes to a specified temperature or higher, and the control section stops the water injection by the water injection section when the temperature of the processing-object materials becomes lower than the specified temperature.

3. The solidification processing apparatus as claimed in claim 1, further comprising an input section to which an operation stop command is to be inputted, wherein upon input of a stop command to the input section, the control section performs water injection by the water injection section for a specified time duration.

4. The solidification processing apparatus as claimed in claim 1, wherein the control section includes control means for exerting such control as to start water injection when the temperature of the processing-object materials comes to a specified temperature or higher and to stop the water injection when the temperature of the processing-object materials becomes lower than the specified temperature.

5. The solidification processing apparatus as claimed in claim 1, wherein the control section performs water injection into the casing before stopping the operation.

6. The solidification processing apparatus as claimed in claim 1, wherein each of the first, second and third screw members has a screw blade portion and thickness of the screw blade portions of the first, second and third screw members are configured in a sequentially increasing manner.

7. The solidification processing apparatus as claimed in claim 1, wherein each of the first, second and third screw members has a screw blade portion, and axial lengths of the screw blade portions of the first, second and third screw members along a longitudinal direction of the shaft portions are configured in a sequentially decreasing manner.

8. The solidification processing apparatus as claimed in claim 1, further comprising a plurality of lining pierces pieces surrounding the second and third screw members.

9. A solidification processing method for kneading and compacting processing-object materials containing at least thermoplastics and paper refuse or wood refuse to manufacture solid fuels, the method comprising the steps of:
providing the solidification processing apparatus of claim 5;
first performing water injection to processing-object materials to impregnate paper refuse or wood refuse with water;
subjecting the processing-object materials to a first turn step of starting and kneading by the screw shafts;
then subjecting the processing-object materials to a second turn step of compacting by the screw shafts while preventing backflow; and
performing a third turn step of further compacting the processing-object materials by the screw shafts, whereby thermoplastics contained in the processing-object materials are melted by both heat generation caused by the compaction in the second and third turn steps and heating with heaters provided on the end face plat; and the processing-object materials are extruded through discharge holes of the end face plate so as to be solidified and, in parallel with this, while water content injected into the processing-object materials are sucked up as heated steam in a direction opposite to a feed direction of the processing-object materials, temperature of the processing-object materials is detected and, based on a signal showing the detected temperature, quantity of water injection to the processing-object materials is controlled.

10. The solidification processing method as claimed in claim 9, wherein in the processing-object materials, the thermoplastics occupy 40 to 60 wt % (weight percentage) while the paper refuse or wood refuse occupies 30 to 40 wt %.

11. The solidification processing method as claimed in claim 9, wherein when the water content of the processing-object materials is about 15 wt %, the temperature of the processing-object materials is controlled to within a temperature range of 100° C. to 140° C.

12. The solidification processing method as claimed in claim 9, wherein when the water content of the processing-object materials is 20 wt % or more, the temperature of the processing-object materials is controlled to within a temperature range of 120° C. to 180° C.

* * * * *